United States Patent
Xie et al.

(10) Patent No.: US 8,865,310 B2
(45) Date of Patent: Oct. 21, 2014

(54) POLYMER SYSTEMS WITH MULTIPLE SHAPE MEMORY EFFECT

(75) Inventors: Tao Xie, Troy, MI (US); Xingcheng Xiao, Troy, MI (US); Yang T. Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 812 days.

(21) Appl. No.: 12/181,562

(22) Filed: Jul. 29, 2008

(65) Prior Publication Data

US 2010/0028683 A1 Feb. 4, 2010

(51) Int. Cl.
*B32B 27/38* (2006.01)
*B32B 37/00* (2006.01)
*B32B 7/02* (2006.01)
*B32B 27/08* (2006.01)
*B29C 61/06* (2006.01)

(52) U.S. Cl.
CPC ............ *B32B 7/02* (2013.01); *B32B 2307/736* (2013.01); *B32B 27/08* (2013.01); *B32B 27/38* (2013.01); *B29C 61/0616* (2013.01)
USPC .......................................................... 428/413

(58) Field of Classification Search
None
See application file for complete search history.

(56) References Cited

U.S. PATENT DOCUMENTS

| | | | |
|---|---|---|---|
| 4,252,936 A | 2/1981 | Rinde et al. | |
| 5,755,913 A | 5/1998 | Liaw et al. | |
| 6,773,535 B1 | 8/2004 | Wetzel | |
| 7,188,498 B2 | 3/2007 | Browne et al. | |
| 2001/0047579 A1 | 12/2001 | Lee et al. | |
| 2003/0116273 A1* | 6/2003 | Nakamura et al. | 156/330 |
| 2004/0131823 A1* | 7/2004 | Rodgers et al. | 428/100 |
| 2005/0151385 A1 | 7/2005 | Autumn et al. | |
| 2005/0167556 A1 | 8/2005 | Fontana et al. | |
| 2005/0246873 A1* | 11/2005 | Tachauer et al. | 24/451 |
| 2005/0274455 A1 | 12/2005 | Extrand | |
| 2005/0277084 A1* | 12/2005 | Cinader et al. | 433/20 |
| 2006/0036045 A1 | 2/2006 | Wilson et al. | |
| 2006/0156535 A1 | 7/2006 | Browne et al. | |
| 2007/0289786 A1 | 12/2007 | Cutkosky et al. | |
| 2008/0257486 A1* | 10/2008 | Xie et al. | 156/247 |
| 2008/0292848 A1* | 11/2008 | Xie et al. | 428/174 |
| 2009/0090461 A1* | 4/2009 | Xie et al. | 156/247 |
| 2009/0130391 A1* | 5/2009 | Taya | 428/172 |

FOREIGN PATENT DOCUMENTS

WO WO2007/070877 * 6/2007

OTHER PUBLICATIONS

Kumar et al., Progress in shape memory epoxy resins, Reactive & Functional Polymers (2012).*
D. H. Kaelble, Dynamic and Tensile Properties of Epoxy Resins, Journal of Applied Polymer Science vol. 9, pp. 1213-1225 (1965), St. Paul, Minnesota.
Technology Publishing Company, Inc., Reference Book for Composites Technology, 1989, Chapter 2, Epoxy Resins, p. 25.

* cited by examiner

*Primary Examiner* — Callie Shosho
*Assistant Examiner* — Coris Fung
(74) *Attorney, Agent, or Firm* — BrooksGroup

(57) ABSTRACT

A polymer material system that consists of multiple SMP layers of different shape memory transition temperatures in a multilayer construction to achieve and tailor a multiple shape memory effect. Wherein two SMP layers of different shape memory transition temperatures are utilized, a triple shape memory effect is achieved.

19 Claims, 4 Drawing Sheets

POLYMER SYSTEMS WITH MULTIPLE SHAPE MEMORY EFFECT

TECHNICAL FIELD

The field to which the disclosure generally relates includes polymeric materials, and more specifically to a shape memory polymeric material systems that can fix to multiple deformed temporary shapes and recover to their original shape only upon external stimuli.

BACKGROUND

Shape memory polymers (SMPs) represent responsive polymers that can fix to deformed temporary shapes and recover to their permanent (original) shapes only upon external stimuli.

SUMMARY OF EXEMPLARY EMBODIMENTS OF THE INVENTION

One exemplary embodiment may include a polymer material system that may include multiple SMP layers of different shape memory transition temperatures in a multilayer construction to achieve and tailor a multiple shape memory effect.

More specifically, one exemplary embodiment may include separately synthesizing two separate polymers each having a particular and individual dual shape memory effect (DSME). The two materials are then coupled together to form a bi-layer polymeric material that exhibits triple shape memory effect (TSME). The two polymeric materials forming the layers in this exemplary embodiment have well separated thermal transitions, strong interfaces, and an appropriate balance of moduli and weight ratio between the layers to achieve reliable TSME.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1A:
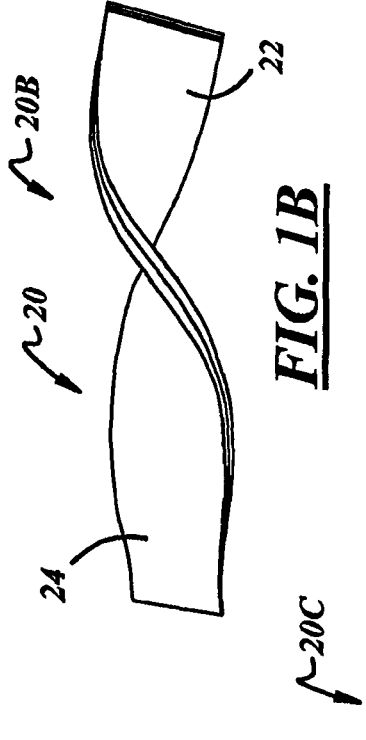
FIG. 1A is a perspective view of a generic bi-layer polymeric material having a triple shape memory effect in its original shape.
Figure 1B:
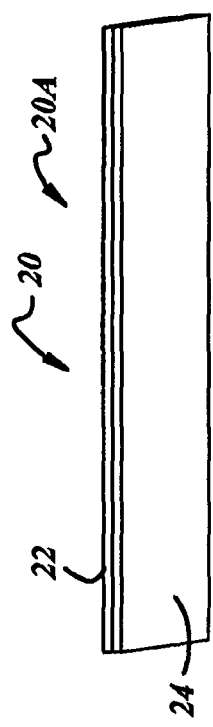
FIG. 1B is a perspective view of the bi-layer polymeric material of FIG. 1A transformed from its original permanent shape to a first temporary shape.
Figure 1C:
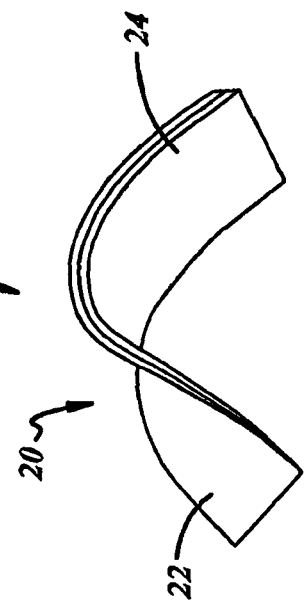
FIG. 1C is a perspective view of the bi-layer polymeric material of FIG. 1A transformed from its first temporary shape to a second temporary shape.
Figure 1E:
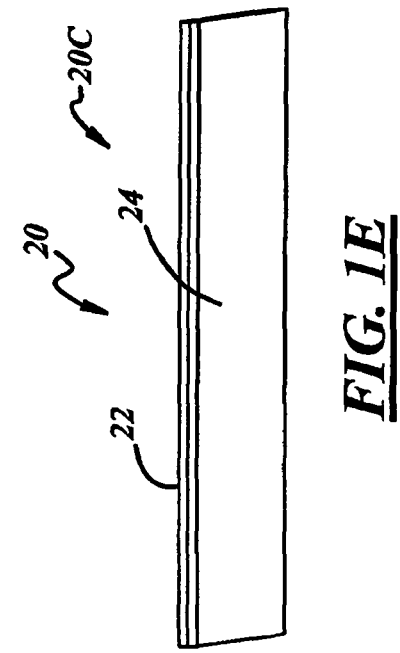
FIG. 1E is a perspective view of the bi-layer polymeric material of FIG. 1A reverted from its first temporary shape to its original permanent shape.

Referring first to FIGS. 1A-1E, a generic version of a bi-layer polymeric material 20 having triple shape memory effect (TSME) is illustrated in its original permanent shape (shown as 20A in FIGS. 1A and 1E), a first temporary shape (shown as 20B in FIGS. 1B and 1D), and a second temporary shape (shown as 20C FIG. 1C). An exemplary embodiment of a bi-layer polymeric material 40 has TSME, designated BE3, will be described in FIGS. 5A-5E below.

The bi-layer polymeric material 20 may include a first material layer 22 coupled to a second material layer 24. In FIG. 1A, the bi-layer polymeric material 20 is shown in its permanent shape 20A. By definition, the permanent original shape 20A is the shape in which the bi-layer polymeric material 20 will remain in the absence of deformation under load and elevated temperatures as described in FIGS. 1B-1D below.

In FIG. 1B, the permanent shape 20A may be heated to a first elevated temperature $T_{high}$ and then deformed under stress to yield a first temporary shape 20B, a shape which may be different in visual appearance from the permanent shape 20A. By definition, the first elevated temperature $T_{high}$ is a temperature sufficiently high to ensure a phase transition for both the first polymeric material layer 22 and the second polymeric material layer 24 (i.e. is a temperature above the glass transition temperature ($T_g$) of the polymer materials in the first polymeric material layer 22 and the second polymeric material layer 24). The bi-layer polymeric material 20 may then be cooled under stress to a mid-level temperature $T_{mid}$, wherein the stress may be relieved to fix the first temporary shape 20B. By definition, the mid-level temperature $T_{mid}$ is a temperature below the glass transition temperature of one of the two polymeric material layers 22 or 24, but above the glass transition temperature of the other of the two polymeric material layers 22 or 24.

Next, as shown in FIG. 1C, the first temporary shape 20B may be deformed under stress at the mid-level temperature $T_{mid}$ to form the second temporary shape 20C. The second temporary shape 20C may then be cooled to a low temperature $T_{low}$ under stress. By definition, the temperature $T_{low}$ is below the glass transition temperature $T_g$ for both of the polymer materials corresponding to polymeric material layers 22 and 24. Next, the stress is removed to yield the second temporary shape 20C.

Figure 1D:
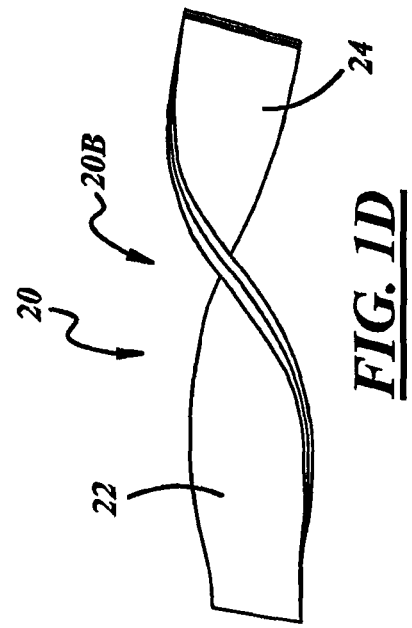
FIG. 1D is a perspective view of the bi-layer polymeric material of FIG. 1A reverted from its second temporary shape to its first temporary shape.

To recover the first temporary shape 20B from the second temporary shape 20C, as shown in FIG. 1D, the bi-layer polymeric material 20 may be reheated from the low temperature $T_{low}$ to the mid-level temperature $T_{mid}$ in the absence of stress.

Finally, to recover the permanent shape 20A from the first temporary shape 20B, as shown in FIG. 1B, the bi-layer polymeric material 20 may be reheated from the mid-level temperature $T_{mid}$ to the first elevated temperature $T_{high}$ in the absence of stress.

In order to achieve TSME as described in FIGS. 1A-1E above, the bi-layer material 20 may include certain formation guidelines.

First, the first material layer 22 and the second material layer 24 may have well separated thermal transitions. Well separated thermal transitions are defined in terms of glass transition temperature $T_g$ and how the bi-layer material 20 can be characterized on a dynamic mechanical analysis curve ("DMA curve"), a characterization that measures the bi-layer material's storage moduli at a given temperature. A well separated thermal transition may be achieved wherein the DMA curve of the bi-layer material 20 has a mid-level plateau in storage modulus between the $T_g$ of the first material layer 22 and the second material layer 24, a higher plateau at a temperature less than the $T_g$ of the first material layer 22 and the second material layer 24, and a lower plateau at a temperature above the $T_g$ of the first material layer 22 and the second material layer 24.

Moreover, the first material layer 22 may experience a strong interface with the second material layer 24 over the wide ranges of temperatures in which the bi-layer material 20 is utilized, including specifically the temperatures at which the bi-layer material 20 may be transformed between its permanent shape 20A, its first temporary shape 20B, and its second temporary shape 20C as will be described further below. In other words, the first material layer 22 and second material layer 24 may be strongly bonded to each other to prevent delamination regardless of whether the bi-layer material 20 is in its permanent shape 20A, its first temporary shape 20B, or its second temporary shape 20C. This strong interface may be the result of numerous adhesion phenomenon between two surfaces known to those of ordinary skill in the adhesion art, including but not limited to covalent bonding, non-covalent bonding, and mechanical adhesion that may occur when the first material layer 22 is coupled to the second material layer 24.

Further, the first polymeric material layer 22 and second polymeric material 24 may have an appropriate balance of moduli and weight ratio between the layers 22, 24 to achieve optimized TSME.

In theory, many polymeric materials may be used in the formulations of the bi-layer polymeric materials 20.

In one exemplary embodiment, a rigid aromatic diepoxide (EPON 826), a flexible aliphatic diepoxide (NGDE), and an aliphatic diamine (Jeffamine D-230) may be used to formulate epoxy thermosetting bi-layer polymeric materials 20 that function as shape memory polymers (SMP's). One exemplary embodiment of the formulations is included in the Experimental Section described below. Moreover, one specific exemplary embodiment, BE3, will be illustrated in its permanent shape and temporary shapes below in FIGS. 4B and 5A-5E.

By varying the ratio between EPON 826 and NGDE, two epoxy dual shape SMP's, for use in the first polymeric material layer and second polymeric material layer respectively, that differ in the overall molecular rigidity were synthesized. These two epoxy SMP polymers (labeled as L and H) possess glass transition temperatures ($T_g$'s) of 38 and 75 degrees Celsius, respectively (based on their storage moduli in the DMA curves). Here, the sample designations L and H indicate their low and high $T_g$'s on a relative basis.

Figure 2A:
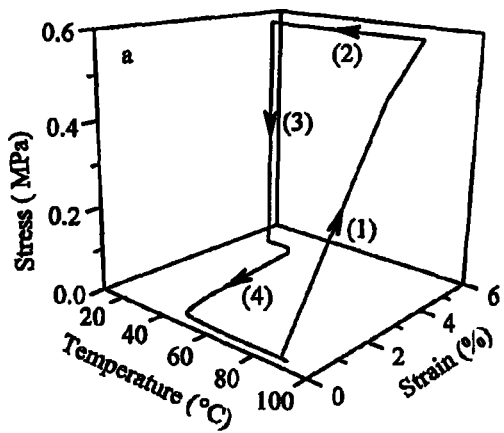
FIG. 2A illustrates a dual-shape memory cycle graph for epoxy SMP polymer L according to an exemplary embodiment.
Figure 2B:
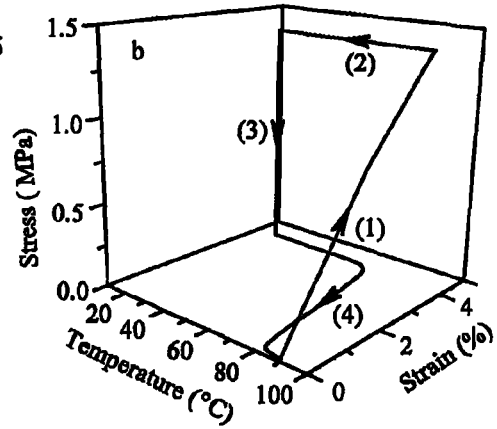
FIG. 2B illustrates a dual-shape memory cycle graph for epoxy SMP polymer H according to an exemplary embodiment.

Referring now to FIGS. 2A and 2B, the dual-shape memory cycles for polymers L and H are each individually illustrated. In these Figures, the polymers were formed to a specific shape (i.e. in their permanent shapes) at ambient temperatures and without load (i.e. stress). The polymers were then heated to a temperature above their respective glass transition temperature under increasing stress until a desired strain was achieved (as shown along line (1)) to change the shape of the polymer from its original permanent shape to a temporary shape. The original permanent shape is the shape of the polymeric material while exhibiting no strain (regardless of temperature or stress applied thereto), while the temporary shape is a shape that exhibits elevated strain as compared to the original shape (regardless of temperature or stress applied thereto).

The polymers were then cooled to a temperature below their respective glass transition temperature while maintaining their respective stress (as shown along line (2)). Next, the stress was relieved on the respective polymer, as shown along line (3), without a reduction in strain, thus confirming that the polymer remained in its temporary shape. Finally, the polymer was heated back to a temperature above its glass transition temperature in the absence of stress, as shown along line (4). The polymer reverted back to its original shape, as confirmed wherein the strain on the polymer reverted to 0% strain. Thus, FIGS. 2A and 2B confirm that both polymer L and H each display dual-shape memory properties with shape fixities and recovery around 100%.

Figure 3A:
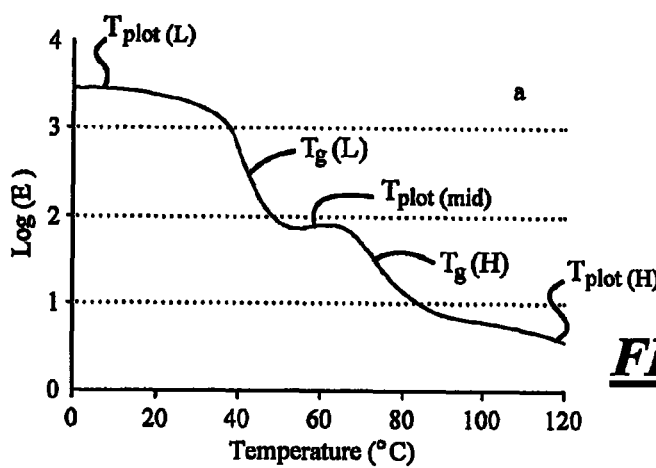
FIG. 3A illustrates a dynamic mechanical analysis curve for bi-layer polymer material BE2 according to an exemplary embodiment.
Figure 3B:
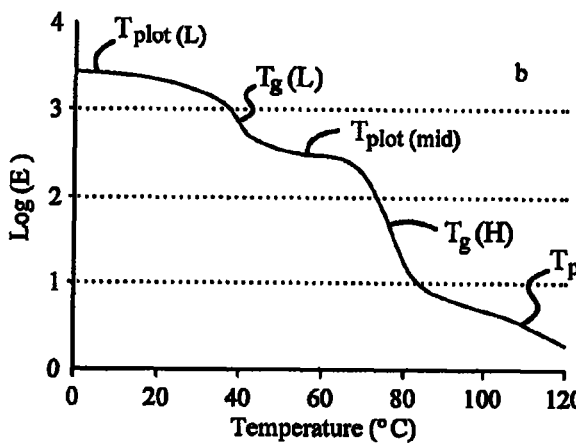
FIG. 3B illustrates a dynamic mechanical analysis curve for bi-layer polymer material BE3 according to another exemplary embodiment.

Accordingly, four bi-layer epoxy polymers (labeled BE1, BE2, BE3 and BE4 respectively) consisting of polymer L layer and polymer H layer at different weight ratios (shown in Table 1) were synthesized using a two-step curing process. The DMA curve for BE2 (FIG. 3A) shows two glass transitions ($T_g$(L) and $T_g$(H)) corresponding to epoxy L and H, respectively. These two glass transitions are well-separated, which results in a plateau in storage modulus ($T_{plat}$(Mid)) between 50 and 65 degrees Celsius, in addition to the two plateaus ($T_{plat}$(L) and $T_{plat}$(H) below the Tg of epoxy L and above the $T_g$ of epoxy H. The DMA curves for BE3 (FIG. 3B), BE1, and BE4 (not shown) display similar features except that their respective storage moduli corresponding to the mid-plateau varies depending on the weight ratios between L and H in the samples.

TABLE 1

Summary of the triple-shape memory properties.

| Sample ID | Weight ratio (L/H) | $R_f$(A→B) (%) | $R_f$(B→C) (%) | $R_r$(C→B) (%) | $R_r$(B→A) (%) |
|---|---|---|---|---|---|
| BE1 | 2.78 | 76.4 | 96.4 | 91.5 | 99.0 |
| BE2 | 2.61 | 78.2 | 93.8 | 98.3 | 100.0 |
| BE3 | 1.27 | 95.6 | 83.3 | 92.8 | 103.6 |
| BE4 | 0.44 | 97.4 | 71.4 | 92.5 | 98.7 |

TABLE 1-continued

Summary of the triple-shape memory properties.

| Sample ID | Weight ratio (L/H) | $R_f(A \rightarrow B)$ (%) | $R_f(B \rightarrow C)$ (%) | $R_r(C \rightarrow B)$ (%) | $R_r(B \rightarrow A)$ (%) |
|---|---|---|---|---|---|
| H | 0 | — | 100.0 | — | 98.6 |
| L | ∞ | 100.0 | — | 100.8 | — |

Figure 4A:
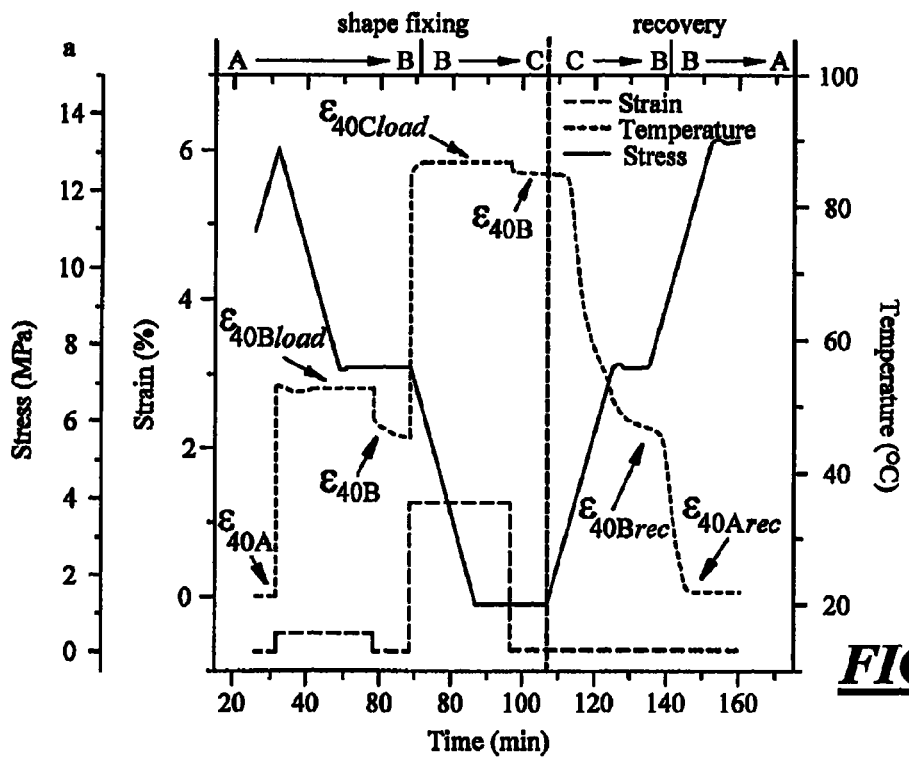
FIG. 4A illustrates a graphical analysis of a triple-shape memory cycle for the bi-layer polymer material BE2 according to one exemplary embodiment.

The triple-shape memory cycle for BE2 is illustrated in FIG. 4A. In the two-step shape fixing process, the permanent shape A was first heated to $T_{high}$ (about 90 degrees Celsius, which is above the $T_g$ of epoxy H) and deformed. Cooling under the stress to $T_{mid}$ (about 56 degrees Celsius, which falls in the middle of the mid-plateau in the DMA curve) and releasing the stress fixed temporary shape B, corresponding to $\epsilon_B$. In the second fixing step, shape B was further deformed under a larger stress and cooled down to $T_{low}$ (about 20 degrees Celsius). Releasing the stress after cooling led to temporary shape C ($\epsilon_c$). Here, the glassification of epoxy H at $T_{mid}$ and L at $T_{low}$ was responsible for fixing shapes B and C, respectively. For recovery, shape C was heated to $T_{mid}$, yielding the recovered shape B ($\epsilon_{Brec}$). The recovered shape B remained stable until the temperature was further increased to $T_{high}$, leading to the recovered shape A ($\epsilon_{Arec}$). Under the identical thermomechanical conditions, the triple-shape memory cycle was repeated two more times using the same sample and no noticeable difference was observed in the shape memory curves.

Figure 4B:
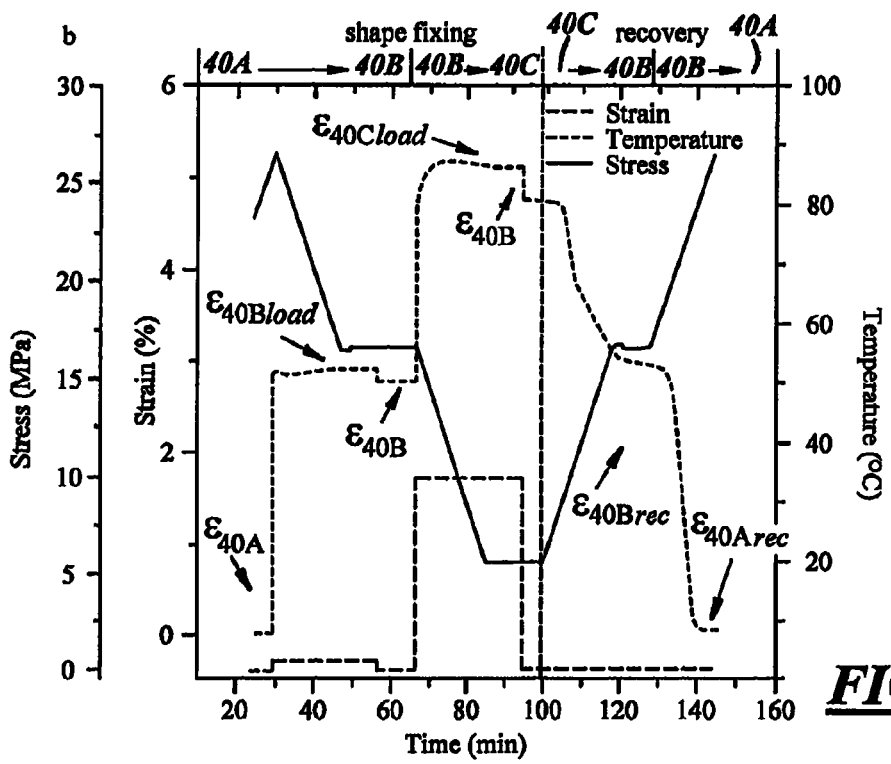
FIG. 4B illustrates a graphical analysis of a triple-shape memory cycle for the bi-layer polymer material BE3 according to one exemplary embodiment.

Qualitatively, the bi-layer samples BE1, BE3, and BE4 also show triple-shape memory capability. For comparison, the triple-shape memory cycle for BE3 is displayed graphically in FIG. 4B and illustrated below in FIGS. 5A-5E. A notable difference between FIG. 4A and FIG. 4B is that a much smaller stress was used to deform and fix shape C (shown as 40C in FIG. 5C) for BE3, which was attributed to its lower storage modulus at $T_{mid}$ than that of BE2. The quantitative triple-shape memory properties (shape fixity $R_f$ and shape recovery $R_r$) for all the bi-layer polymer systems are summarized in Table 1 above. Data in this table shows that $R_f(A \rightarrow B)$ increases as the weight ratio of the epoxy L and the epoxy H decreases (from BE1 to BE4, in that particular order), while $R_f(B \rightarrow C)$ follows an opposite trend. Such trends can be readily explained by a mechanism that can be viewed as an "arm-wresting" contest between L and H. At the first stage of shape fixing (A→B) at $T_{mid}$, the fixing relies on the freezing of molecular mobility of the H layer while the L layer tends to retain its original shape and thus disfavors the shape fixing of the bi-layer polymers. The situation reverses at the second stage of the shape fixing (B→C) that occurs at $T_{low}$, i.e., the fixing relies on the L layer, while the layer H has a tendency to keep shape B. Overall, the shape fixities of the bi-layer polymers are determined by the weight ratio between the two layers and their moduli at the corresponding shape fixing temperatures. In terms of shape recovery, all $R_c$ values in Table 1 are higher than 91%, indicating that they recover well in all cases.

The TSME associated with the bi-layer polymer systems BE1, BE2, BE3 and BE4 benefited from the strong interface between the two epoxy layers. The unreacted epoxy groups or amine groups on the surface of the first cured epoxy layer (for polymer L) continued to react with the second epoxy liquid (for polymer H) poured onto it, producing a strong interface. Without the strong interface, the bi-layer polymer synthesis BE1, BE2, BE3, or BE4 may not have exhibited TSME, instead, delamination may have occurred during the shape memory cycles. In principle, the general approach of achieving TSME with bi-layer construction can be extended into any combination of two DSMP's, provided that the interface between the first material layer and the second material layer is strong enough. Due to the versatility of the material design, achieving multiple-shape memory effect beyond triple-shape is possible with material constructions consisting of more than two layers.

Experimental Materials

The diglycidyl ether bisphenol A epoxy monomer (EPON 826) and the poly(propylene glycol)bis(2-aminopropyl) ether curing agent (Jeffamine D-230) were obtained from Hexion and Huntsman, respectively. Neopentyl glycol diglycidyl ether (NGDE) was purchased from TCI America. All chemicals were used as received.

Synthesis of Epoxy Polymer H and L

EPON 826 was first melted at 75 degrees Celsius for 15 minutes. It was then mixed with NGDE and Jeffamine D-230 at a mole ratio of 1.6/0.4/1. The mixture was poured into an aluminum mold, cured at 100 degrees Celsius for 1 h, and postcured at 130 degrees Celsius for 1 hour to produce the epoxy polymer H. The cured epoxy was demolded and cut into desirable sizes prior to testing. Epoxy polymer L was produced in the same fashion except that the mole ratio of EPON 826/NGDE/Jeffamine D-230 was 0.8/1.2/1.

Synthesis of Epoxy Bilayer Polymer Samples

The epoxy liquid mixture corresponding to epoxy polymer H was cured in an aluminum mold at 100 degrees Celsius for 40 minutes to produce the first epoxy layer. The epoxy liquid mixture corresponding to epoxy polymer L was poured on top of the cured first epoxy layer, cured at 100 degrees Celsius for 40 minutes, and postcured at 130 degrees Celsius for 1 hour. Following this two step curing process, four bilayer epoxy polymer samples (namely, polymer material systems BE1, BE2, BE3 and BE4) were produced by varying the weight ratio between the two epoxy liquids. Specifically, the weight ratios between polymer L and polymer H in BE1, BE2, BE3, and BE4 are 2.78, 2.61, 1.27, and 0.44, respectively.

Thermomechanical Characterization

The dynamic mechanical analysis (DMA) experiments were performed in a dual cantilever mode using a DMA Q800 (TA instruments) and the testing parameters were: constant frequency=1 Hz; oscillation amplitude=30 μm; heating rate=1 degree Celsius/minute.

Shape Memory Cycles

All quantitative shape memory cycles were obtained using a DMA 2980 in a three point bending mode. The analysis was conducted under a static force mode and the heating and cooling rates were 1 degrees Celsius/minute.

Figure 5A:
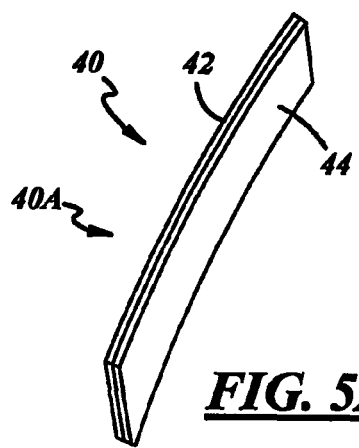
FIG. 5A is a perspective view for the bi-layer polymeric material BE3 in its permanent original shape according to one exemplary embodiment.
Figure 5B:
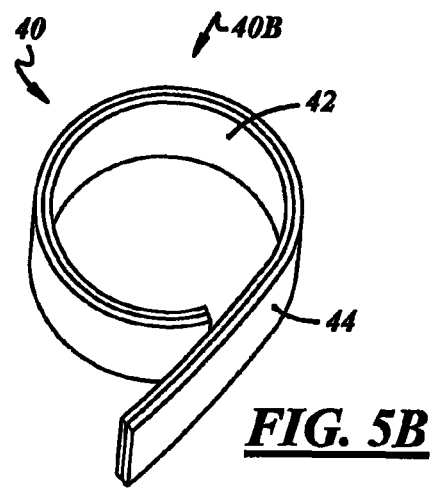
FIG. 5B is a perspective view of the bi-layer polymeric material BE3 of FIG. 5A transformed from its original permanent shape to a first temporary shape.
Figure 5C:
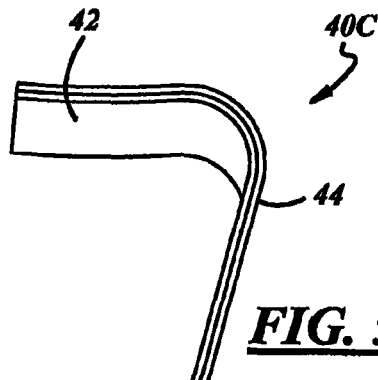
FIG. 5C is a perspective view of the bi-layer polymeric material BE3 of FIG. 1A transformed from its first temporary shape to a second temporary shape.
Figure 5D:
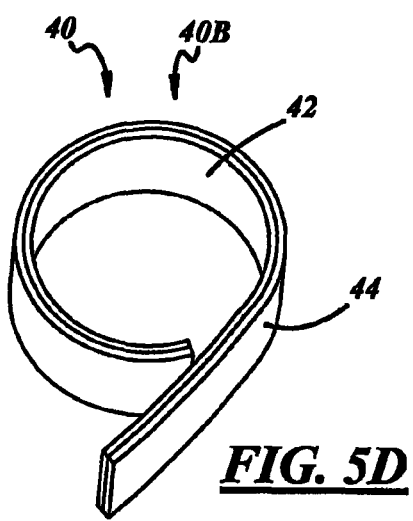
FIG. 5D is a perspective view of the bi-layer polymeric material BE3 of FIG. 5A reverted from its second temporary shape to its first temporary shape.
Figure 5E:
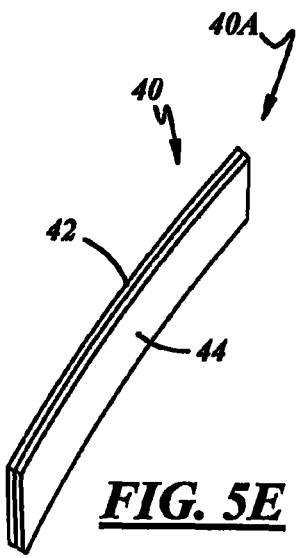
FIG. 5E is a perspective view of the bi-layer polymeric material BE3 of FIG. 5A reverted from its first temporary shape to its original permanent shape.

For visual demonstration of the TSME, as shown in FIGS. 5A-5E, BE3 (shown as 40 in FIGS. 5A-5E that includes polymer layer L (shown as 42 in FIGS. 5A-5E) coupled to polymer layer H (shown as 44 in FIGS. 5A-5E) with a rectangular shape (shape 40A as shown in FIG. 5A) was heated in an oven preset at 90 degrees Celsius for 10 minutes. It was then deformed manually after it was taken out of the oven and immediately immersed into a hot water bath preset at 56.0±0.5 degrees Celsius for 1 minute. This yielded the first temporary shape 40B as shown in FIG. 5B. Shape 40B was immersed in the water bath for another 1 minute. Afterwards, it was taken out of the bath again, immediately deformed, and cooled down to 22 degrees Celsius to fix the second temporary shape 40C, as shown in FIG. 5C. For recovery, second temporary shape 40C was put back into the water bath (56.0±0.5 degrees Celsius) for 1 minute, which changed to shape 40B as shown in FIG. 5D. Recovery of permanent shape 40A was performed by heating temporary shape 40B to 90 degrees Celsius for 5 minutes, as shown in FIG. 5E.

While one exemplary embodiment illustrates epoxy thermosetting polymers utilizing a specific subset of epoxies and amines are used for use both in the first polymeric material layer 42 and the second polymeric material layer 44, other polymeric systems may be utilized. For example, the polymeric composition of the first polymeric layer and second polymeric layer may be formed from differing polymeric backbone materials and/or crosslinking systems, so long as they form a multi-layer material that exhibits TSME effect and meets the formation guidelines described above in terms of a strong interface between layers, well separated thermal transitions, and an appropriate balance of moduli and weight ratio to prevent delamination as the bi-layer material is transformed from its permanent state to its multiple temporary shapes under appropriate heat and stress. Thus, for example, polymeric materials systems other than epoxy/amine systems may be used in one or both of the layers.

Polymeric systems with triple-shape functionality may enable application is various fields because their properties can be adjusted over a wide range. Thus, potential applications for triple-shape memory polymers can exist in many different technologies. For example, triple-shape memory polymers may be useful in automotive applications such as self-repairing autobodies, in medical applications such as for use in degradable medical implants, for electrical applications such as for use in switches or sensors, for common applications such as use in utensils or other tools, or other applications not specifically described herein.

The above description of embodiments of the invention is merely exemplary in nature and, thus, variations thereof are not to be regarded as a departure from the spirit and scope of the invention.

What is claimed is:

1. A polymer system comprising:
   a first polymeric dual shape memory material layer; and
   a second polymeric dual shape memory material layer coupled to said first polymeric dual shape memory material layer to form a bi-layer polymeric material, wherein said first polymeric dual shape memory material layer has a first glass transition temperature, said second polymeric dual shape memory material layer has a second glass transition temperature, and the first glass transition temperature and the second glass transition temperatures are well separated thermal transitions such that the DMA curve of the bi-layer polymeric material has a mid-level plateau in storage modulus between the first glass transition temperature of the first polymeric dual shape memory material layer and the second glass transition temperature of the second polymeric dual shape memory material layer, a higher plateau at a temperature less than the first and second glass transition temperatures, and a lower plateau at a temperature above the first and the second glass transition temperatures;
   wherein said bi-layer polymeric material is capable of transforming between 3 distinct shapes: an original shape, a first temporary shape, and a second temporary shape, without delamination between said first polymeric dual shape memory material layer and said second polymeric dual shape memory material layer, and wherein said first polymeric dual shape memory material layer is covalently bonded to said second polymeric dual shape memory material layer.

2. The polymer system of claim 1, wherein the transformation from said original shape to said first temporary shape comprises:
   heating said bi-layer polymeric material to a first temperature and deforming said bi-layer polymeric material under a first stress from said original shape to said first temporary shape, wherein said first temperature is above the glass transition temperatures of the polymeric material comprising said first polymeric dual shape memory material layer and the polymeric material comprising said second dual shape memory material layer;
   cooling said bi-layer polymeric material to a second temperature, wherein said second temperature is above the glass transition temperature of the polymeric material comprising said first polymeric dual shape memory layer and below the glass transition temperature of the polymeric material comprising said second polymeric dual shape memory material layer; and
   removing said first stress while maintaining said bi-layer polymeric material at said second temperature.

3. The polymer system of claim 2, wherein the transformation from said first temporary shape to said second temporary shape comprises:
   deforming said bi-layer polymeric material under a second stress from said first temporary shape to said second temporary shape at said second temperature;
   cooling said bi-layer polymeric material to a third temperature, wherein said third temperature is below the glass transition temperature of the polymeric material comprising said first polymeric dual shape memory material layer and below the glass transition temperature of the polymeric material comprising said second polymeric dual shape memory material layer; and
   removing said second stress while maintaining said bi-layer polymeric material at said third temperature.

4. The polymer system of claim 3, wherein the transformation from said second temporary shape to said first temporary shape comprises:
   heating said bi-layer polymeric material from said third temperature to said second temperature in the absence of stress applied to said bi-layer polymeric material.

5. The polymer system of claim 4, wherein the transformation from said first temporary shape to said original shape comprises:
   heating said bi-layer polymeric material from said second temperature to said first temperature in the absence of stress applied to said bi-layer polymeric material.

6. The polymer system of claim 5, wherein the interface between said first polymeric dual shape memory material layer and said second polymeric dual shape memory material layer is sufficiently strong to prevent delamination of said first polymeric dual shape memory material layer from said second polymeric dual shape memory material layer as said bi-layer polymeric material transforms between said original shape, said first temporary shape and said second temporary shape.

7. The polymer system of claim 5, wherein said first polymeric dual shape memory material layer comprises an epoxy thermosetting polymeric material.

8. The polymer system of claim 7, wherein said second polymeric dual shape memory material layer comprises an epoxy thermosetting polymeric material.

9. The polymer system of claim 8, wherein the degree of adhesion between said first polymeric dual shape memory material layer and said second polymeric dual shape memory material layer is sufficiently high to prevent delamination of said first polymeric dual shape memory material layer from said second polymeric dual shape memory material layer as said bi-layer polymeric material transforms between said original shape, said first temporary shape and said second temporary shape, and wherein a plurality of unreacted epoxy or amine groups were present on the surface of said first polymeric dual shape memory material layer after being cured, and said first polymeric dual shape memory material layer was subsequently placed in contact with a liquid epoxy which was cured to form the thermosetting polymeric material of the second polymeric dual shape memory material layer and covalent bonds between the first and second polymeric dual shape memory material layers.

10. The polymer system of claim 7, wherein said epoxy thermosetting polymeric material of said first polymeric dual shape memory material layer is prepared from components comprising a rigid aromatic diepoxide, a flexible aliphatic diepoxide, and an aliphatic diamine.

11. The polymer system as set forth in claim 10 wherein the weight ratio of the first polymeric dual shape memory material layer to the second polymeric dual shape memory material layer ranges from 0.44 to 2.78.

12. The polymer system as set forth in claim 10 wherein the rigid aromatic diepoxide is derived from diglycidyl ether bisphenol A epoxy monomer.

13. The polymer system as set forth in claim 10 wherein the flexible aliphatic diepoxide is derived from neopentyl glycol diglycidyl ether.

14. The polymer system as set forth in claim 1 wherein the first polymeric dual shaped memory material layer comprises an epoxy thermosetting polymer material and wherein a plurality of unreacted epoxy or amine groups were present on the surface of said first polymeric dual shape memory material layer, but subsequently reacted with said second polymeric dual shape memory material layer to form covalent bonds.

15. The polymer system as set forth in claim 14 wherein the first polymeric dual shaped memory material comprises an epoxy thermosetting polymeric material prepared from components comprising a rigid aromatic diepoxide, a flexible aliphatic diepoxide, and an aliphatic diamine.

16. The polymer system as set forth in claim 14 wherein the second polymeric dual shaped memory material layer comprises an epoxy thermosetting polymeric material.

17. The polymeric material as set forth in claim 16 wherein the second polymeric dual shaped polymer layer comprises an epoxy thermosetting polymeric material prepared from components comprising a rigid aromatic diepoxide, a flexible aliphatic diepoxide, and an aliphatic diamine consisting essentially of poly(propylene glycol)bis(2-aminopropyl) ether.

18. The polymeric system as set forth in claim 17 wherein the weight ratio of the first polymeric dual shape memory material layer to the second polymeric dual shape memory material layer ranges from 1.27-2.78.

19. A polymer system comprising:
   a first polymeric dual shape memory material layer;
   a second polymeric dual shape memory material layer coupled to said first polymeric dual shape memory material layer to form a bi-layer polymeric material; and
   at least one additional polymeric dual shape memory material layer coupled to said bi-layer polymeric material to form a multi-layer polymeric material, wherein at least two of said first polymeric dual shape memory material layer, said second polymeric dual shape memory material layer and said at least one additional polymeric dual shape memory material layer have respectively well separated thermal transitions such that the DMA curve of the multi-layer polymeric material has a mid-level plateau in storage modulus between the glass transition temperatures of the first and the second polymeric dual shape memory material layers, a higher plateau at a temperature less than the glass transition temperatures of the first and second polymeric dual shape memory material layers, and a lower plateau at a temperature above the glass transition temperatures of the first and the second polymeric dual shape memory material layers;
   wherein said multi-layer polymeric material is capable of transforming between an original shape and at least two distinct temporary shapes without delamination between any coupled layers of said multi-layer polymeric material, and wherein said first polymeric dual shape memory material layer is covalently bonded to said second polymeric dual shape memory material layer.

* * * * *